(12) United States Patent
Nitta et al.

(10) Patent No.: US 8,428,137 B2
(45) Date of Patent: Apr. 23, 2013

(54) MOTION SEARCH APPARATUS IN VIDEO CODING

(75) Inventors: Koyo Nitta, Yokosuka (JP); Hiroe Iwasaki, Yokosuka (JP); Jirou Naganuma, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 344 days.

(21) Appl. No.: 12/675,792

(22) PCT Filed: Sep. 12, 2008

(86) PCT No.: PCT/JP2008/066557
§ 371 (c)(1),
(2), (4) Date: Mar. 1, 2010

(87) PCT Pub. No.: WO2009/035088

PCT Pub. Date: Mar. 19, 2009

(65) Prior Publication Data

US 2010/0215105 A1 Aug. 26, 2010

(30) Foreign Application Priority Data

Sep. 13, 2007 (JP) .................................. 2007-237534

(51) Int. Cl.
*H04B 1/66* (2006.01)
(52) U.S. Cl.
USPC ............ 375/240.16; 375/240.15; 375/240.14; 375/240.12; 382/238; 382/236; 382/239; 348/699

(58) Field of Classification Search ............. 375/240.16, 375/240.15, 240.14, 240.12; 382/238, 236, 382/239; 348/699
See application file for complete search history.

(56) References Cited

U.S. PATENT DOCUMENTS 5,229,866 A * 7/1993 Kashiwagi et al. ........... 358/444
5,696,698 A * 12/1997 Herluison et al. ............ 345/557
(Continued)

FOREIGN PATENT DOCUMENTS

| EP | 1 622 391 A1 | 2/2006 |
| JP | 11 243552 | 9/1999 |

(Continued)

OTHER PUBLICATIONS

Minami, Toshihiro et al., "A Proposal of a One-dimensional Systolic Array Architecture for the Full-search Block Matching Algorithm", IEICE Trans. D-I. vol. J78-D-I, No. 12, pp. 913-925, Dec. 1995, (with partial English translation).

(Continued)

*Primary Examiner* — Shawn An
(74) *Attorney, Agent, or Firm* — Oblon, Spivak, McClelland, Maier & Neustadt, L.L.P.

(57) ABSTRACT

In motion search using a PE array, a technique is provided for enabling high-speed calculation while avoiding bank conflict without increasing a memory for storing pixels outside the screen. When pieces of pixel data of a plurality of lines to be read from the memory 3 (reference image memory 30) exist in a same bank, the conflict bank anticipatory read control unit 10 reads pixel data of a line in advance, and a read data holding circuit 20 holds the data until timing for inputting to a PE array unit 4. Accordingly, bank conflict can be avoided when reading pixel data from the memory 3, so that smooth pipeline processing by the PE array unit 4 can be realized.

4 Claims, 19 Drawing Sheets

U.S. PATENT DOCUMENTS

| | | | |
|---|---|---|---|
| 6,122,442 A | 9/2000 | Purcell et al. | |
| 6,163,576 A | 12/2000 | Lempel | |
| 6,339,656 B1 * | 1/2002 | Marui | 382/236 |
| 7,848,580 B2 * | 12/2010 | Horie et al. | 382/232 |
| 2005/0190976 A1 * | 9/2005 | Todoroki et al. | 382/236 |

FOREIGN PATENT DOCUMENTS

| | | |
|---|---|---|
| JP | 3127980 | 1/2001 |
| JP | 2001 61150 | 3/2001 |
| JP | 2004 80583 | 3/2004 |
| JP | 2005 136455 | 5/2005 |
| JP | 2005 244844 | 9/2005 |
| WO | WO 2005/104027 A2 | 11/2005 |
| WO | WO 2005/104027 A3 | 11/2005 |
| WO | 2007 074555 | 7/2007 |

OTHER PUBLICATIONS

Minami, Toshihiro et al., "A Proposal of the Construction Method of the Motion Vector Detector Suitable for the Telescopic Search", IEICE Trans. D-II, vol. J87-D-II, No. 11, pp. 2007-2024, Nov. 2004, (with partial English translation).

Extended European Search Report issued Nov. 25, 2010 in Application No./ Patent No. 08831148.5-2223/ 2190206 PCT/ JP2008066557.

Yeu-Shen Jehng, et al., "An Efficient and Simple VLSI Tree Architecture for Motion Estimation Algorithms", IEEE Transactions on Signal Processing, vol. 41, No. 2, XP000346029, Feb. 1, 1993, pp. 889-900.

R. Cmar, et al., "Highly Scalable Parallel Parametrizable Architecture of the Motion Estimator", European Design and Test Conference, XP-002337994, Mar. 17, 1997, pp. 208-212.

Jen-Chieh Tuan, et al., "On the Data Reuse and Memory Bandwidth Analysis for Full-Search Block-Matching VLSI Architecture", IEEE Transactions on Circuits and Systems for Video Technology, vol. 12, No. 1, XP011014269, Jan. 1, 2002, pp. 61-72.

Charng L. Lee, "Parallel Implementation of Motion-Compensation for HDTV Video Decoder", IEEE Transactions on Consumer Electronics, XP000789832, May 1, 1998, pp. 251-255

\* cited by examiner

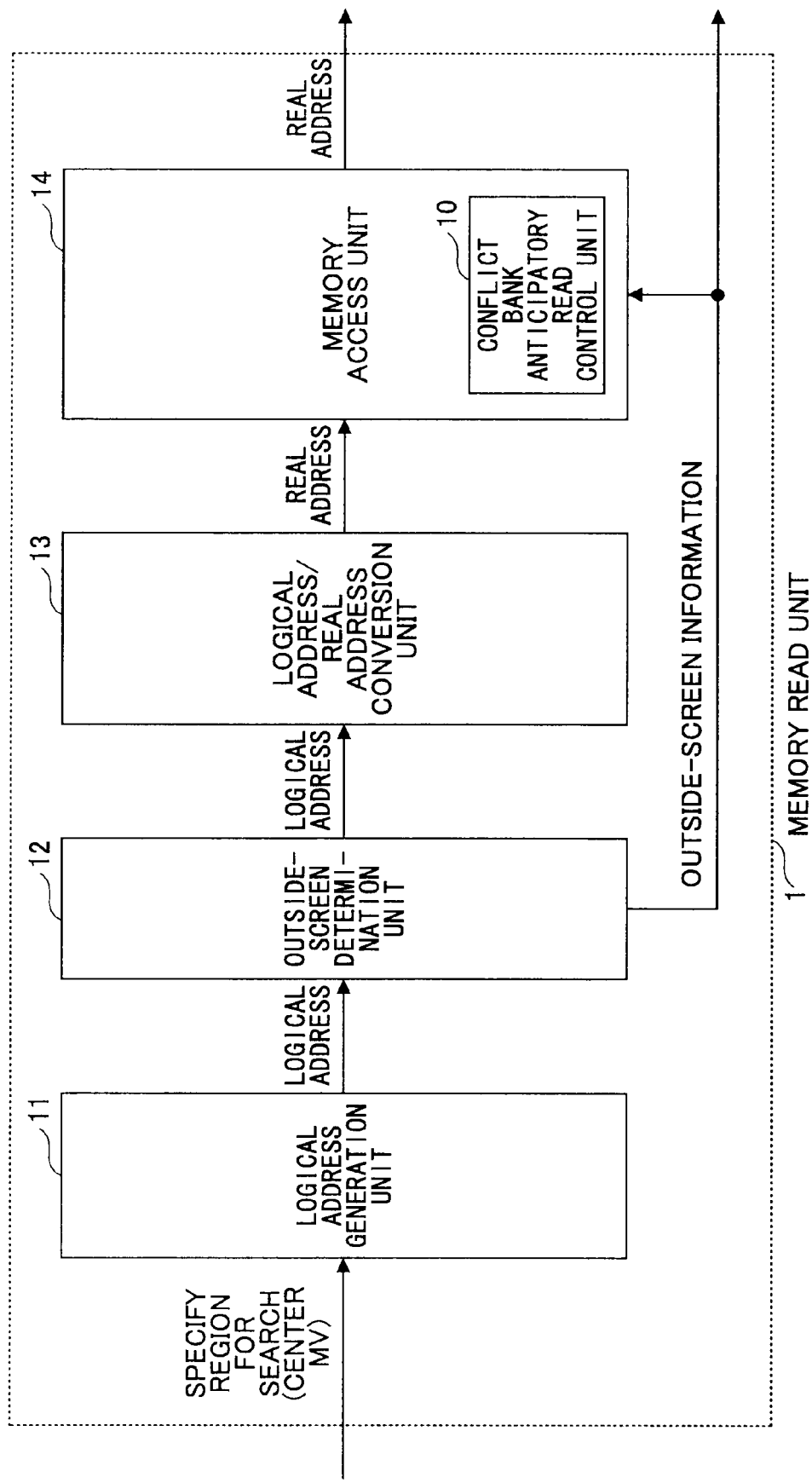

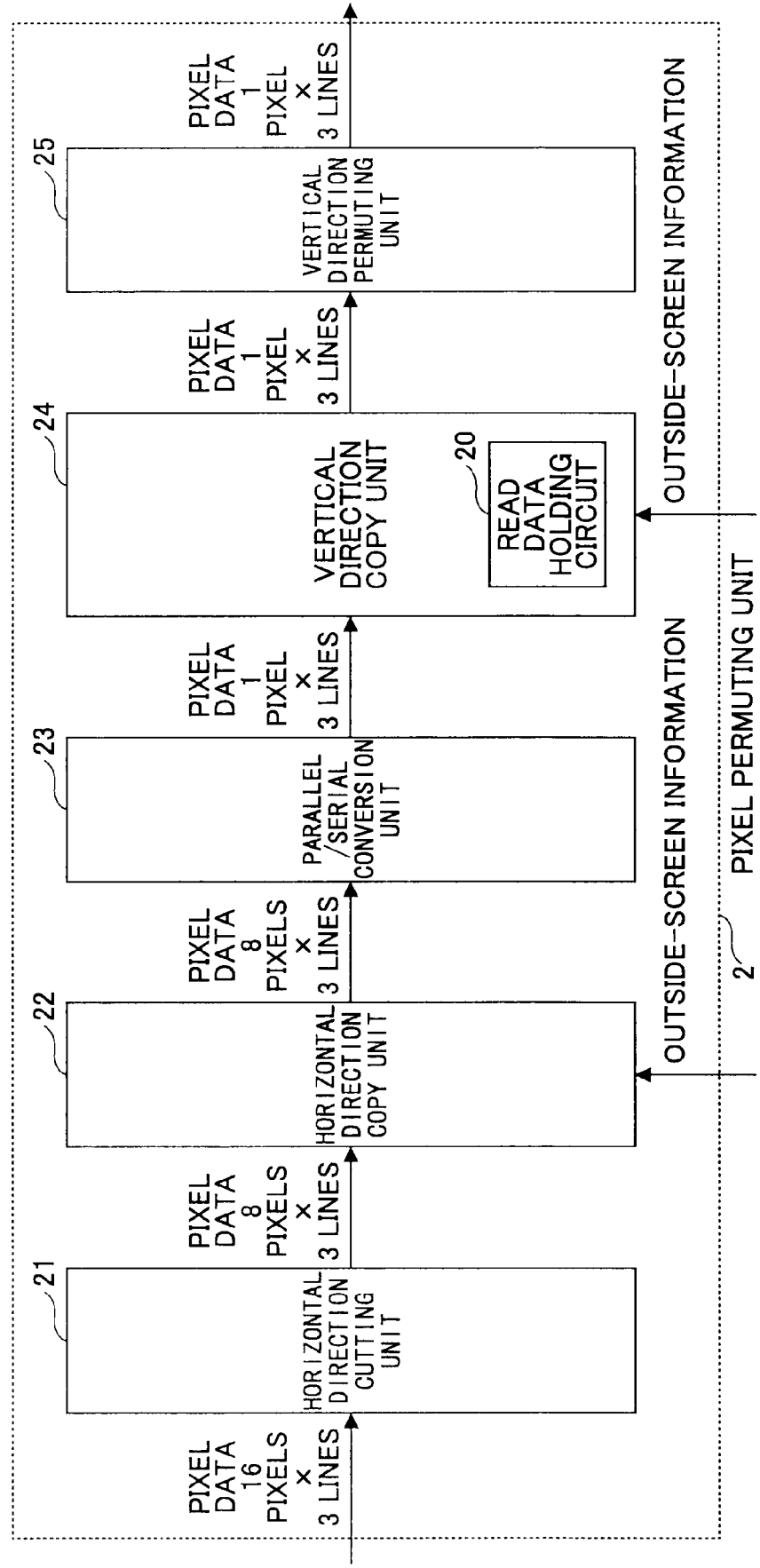

(A1)

X DIRECTION COPY

EILRFLG=10(SCREEN END EXISTS IN THE LEFT SIDE)

| EIXLVAL | MSB | | | | | | | LSB |
|---|---|---|---|---|---|---|---|---|
| | D0 | D1 | D2 | D3 | D4 | D5 | D6 | D7 |
| =0 | D0 | D1 | D2 | D3 | D4 | D5 | D6 | D7 |
| =1 | D0 | D0 | D1 | D2 | D3 | D4 | D5 | D6 |
| =2 | D0 | D0 | D0 | D1 | D2 | D3 | D4 | D5 |
| =3 | D0 | D0 | D0 | D0 | D1 | D2 | D3 | D4 |
| =4 | D0 | D0 | D0 | D0 | D0 | D1 | D2 | D3 |
| =5 | D0 | D0 | D0 | D0 | D0 | D0 | D1 | D2 |
| =6 | D0 | D0 | D0 | D0 | D0 | D0 | D0 | D1 |
| ≧7 | D0 | D0 | D0 | D0 | D0 | D0 | D0 | D0 |

D0=EDI0, D1=EDI1, ···, D6=EDI6, D7=EDI7

(A2)

EIXLVAL=5

| EILRFLG | PROCESS STATUS |
|---|---|
| 0　0 | WITHIN SCREEN |
| 0　1 | RIGHT SIDE OF SCREEN OUTSIDE |
| 1　0 | LEFT SIDE OF SCREEN OUTSIDE |
| 1　1 | RESERVED |

(B2)

WITHIN SCREEN | RIGHT SIDE OF SCREEN OUTSIDE

| D0 | D1 | D2 | D3 | D3 | D3 | D3 | D3 | positions: 0 1 2 3 4 → COPY

EIXLVAL=4

(B1)

EILRFLG=01 (SCREEN END EXISTS IN THE RIGHT SIDE)

| EIXLVAL | MSB | | | | | | | LSB |
|---|---|---|---|---|---|---|---|---|
| =0 | D0 | D1 | D2 | D3 | D4 | D5 | D6 | D7 |
| =1 | D0 | D1 | D2 | D3 | D4 | D5 | D6 | D6 |
| =2 | D0 | D1 | D2 | D3 | D4 | D5 | D5 | D5 |
| =3 | D0 | D1 | D2 | D3 | D4 | D4 | D4 | D4 |
| =4 | D0 | D1 | D2 | D3 | D3 | D3 | D3 | D3 |
| =5 | D0 | D1 | D2 | D2 | D2 | D2 | D2 | D2 |
| =6 | D0 | D1 | D1 | D1 | D1 | D1 | D1 | D1 |
| ≧7 | D0 | D0 | D0 | D0 | D0 | D0 | D0 | D0 |

D0=EDI0, D1=EDI1, ···, D6=EDI6, D7=EDI7

FIG.9A
PE ARRAY
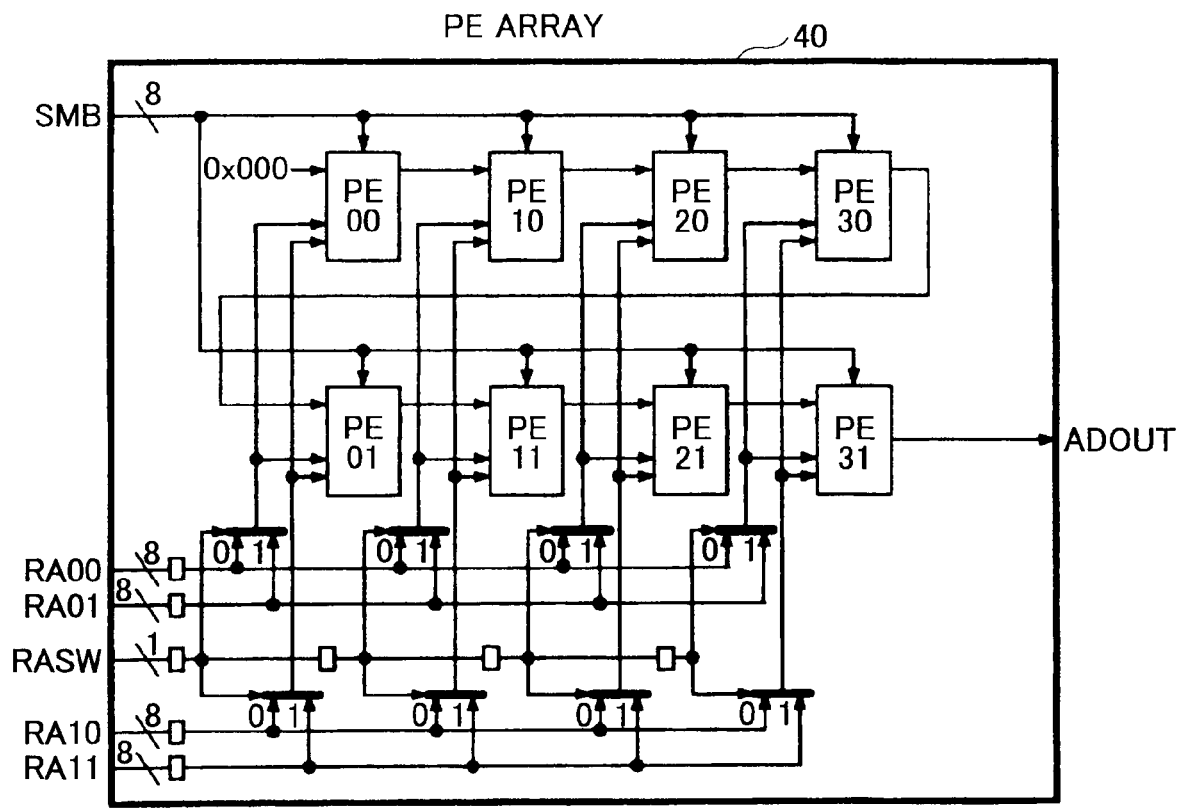
FIG.9B
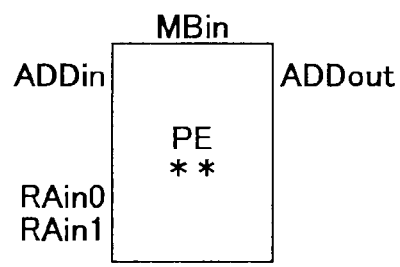
FIG.10A
ORIGINAL IMAGE
| c00 | c10 | c20 | c30 |
|-----|-----|-----|-----|
| c01 | c11 | c21 | c31 |

FIG.10B

REFERENCE IMAGE

| x00 | x10 | x20 | x30 | x40 | x50 |
|-----|-----|-----|-----|-----|-----|
| x01 | x11 | x21 | x31 | x41 | x51 |
| x02 | x12 | x22 | x32 | x42 | x52 |
|     |     |     |     |     |     |

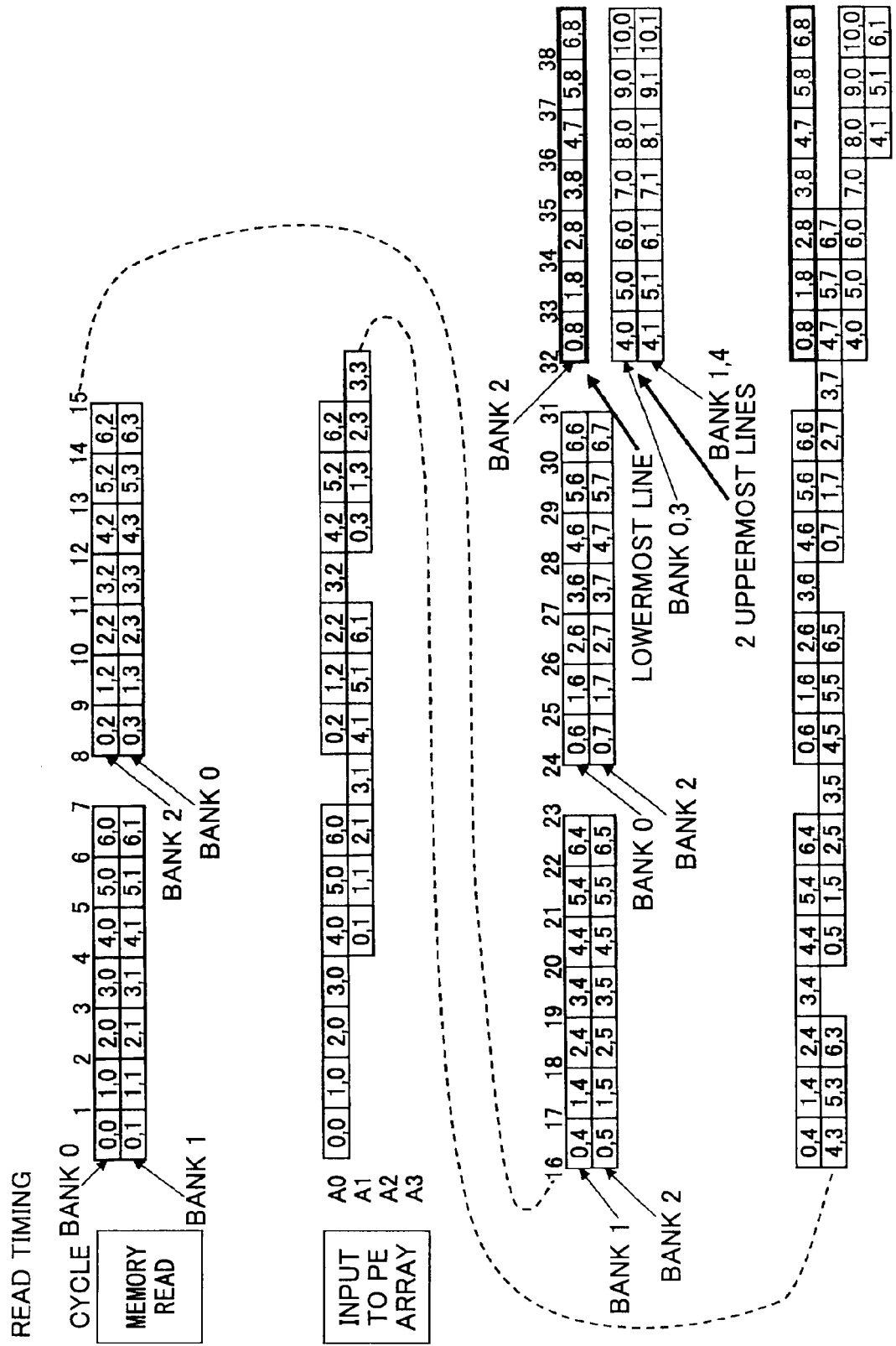

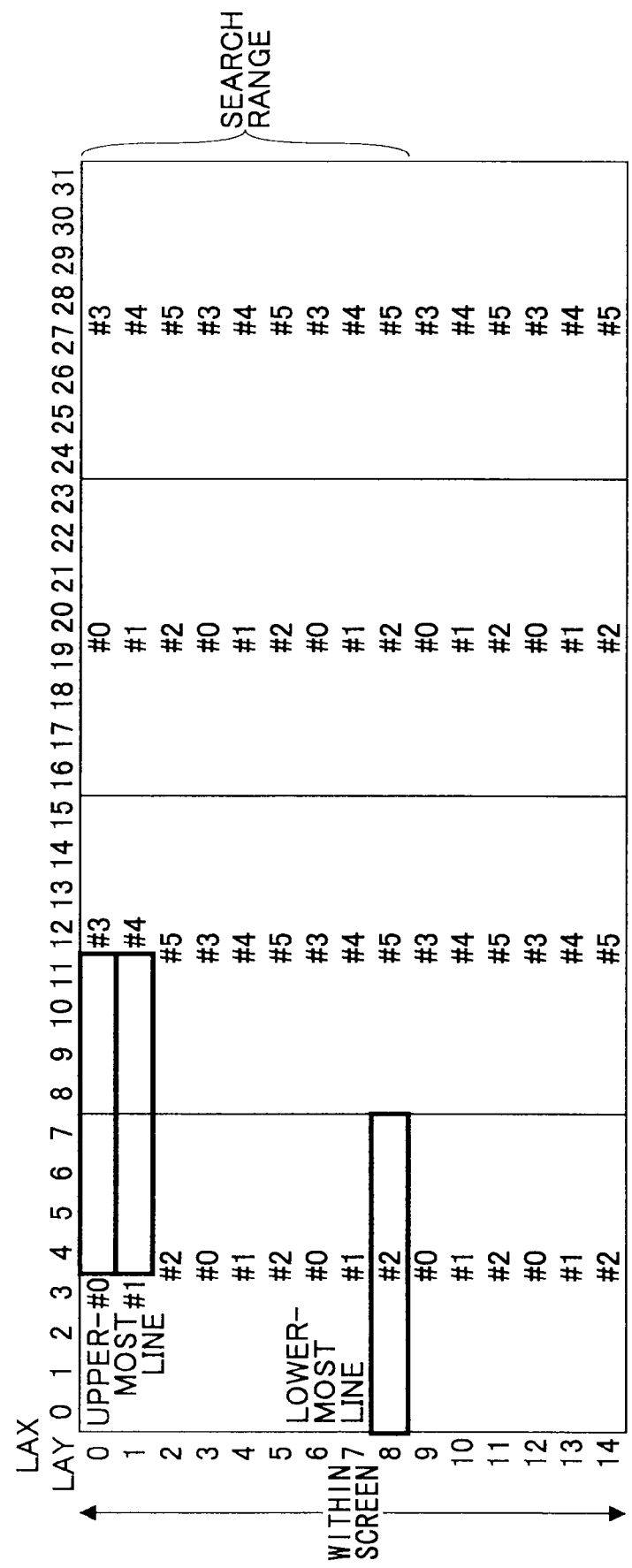

MOTION SEARCH APPARATUS IN VIDEO CODING

TECHNICAL FIELD

The present invention relates to a motion search apparatus in video coding for performing motion search by using a systolic array in video coding.

BACKGROUND ART

The computation amount required for detecting motion vectors is enormous in video coding. Thus, in order to speed up the computation processing, a motion search apparatus using the systolic array has been developed and is being used practically (refer to the non-patent document 1, patent document 1, non-patent document 2, and patent document 2).

The systolic array is a computing apparatus in which a plurality of processor elements (to be referred to as PE hereinafter) are arranged regularly, and calculation target data flows through the PEs like a pipeline so that computational processing is executed by the PEs in parallel and with high speed. The computing apparatus is also called a PE array.

Especially, as to a motion search apparatus for which high speed video coding processing is required, the PE array is used in processing for repeating calculation of the sum of absolute difference (SAD) of pixel values between a coding target block of the original image and a reference image within a motion search range of the reference image, so that speed-up of motion vector detection is realized.

FIG. 9A shows a configuration example of the PE array in a conventional motion search apparatus. This example is configured to calculate the sum of absolute difference between the original image of 4×2 pixels and the reference image by using 8 processor elements PE00-PE31. By increasing the number of PEs, the PE array can be also configured to calculate the sum of absolute difference in units of 4×4 pixels or 8×8 pixels, for example. In addition, by combining a plurality of PE arrays 40 shown in FIG. 9A, a calculation circuit can be configured for calculating the sum of absolute difference of n×m pixels (n≧4, m≧4).

The PE array 40 includes input terminals of original image input data SMB, 4 pieces of reference image input data RA00, RA01, RA10 and RA11, and a reference image switch control input signal RASW for controlling a selector for selecting reference image input data to be calculated. As an output terminal, the PE array 40 includes an output terminal for an output ADOUT of a result of accumulation of the sum of absolute difference.

As shown in FIG. 9B, each PE includes an input terminal MBin for inputting original image input data, an input terminal ADDin for inputting a sum value from a left adjacent PE, an output terminal ADDout for outputting a sum value to a right adjacent PE, and input terminals RAin0 and RAin1 for inputting two pieces of reference image input data.

FIGS. 10A-10C are diagrams for explaining operation of the PE array 40 shown in FIG. 9A. For example, the PE array 40 performs calculation for searching a reference image (pixel values x00, x01, ... ) shown in FIG. 10B for a part by which the sum of absolute value becomes the smallest with respect to a 4×2 pixel group (pixel values c00-c31) of the original image shown in FIG. 10A.

In FIG. 10C, pixel values c00, c10 and c20 ... of the original image are sequentially input to PE00, PE10 and PE20 ... in initial 8 cycles (clock CLKs), and held. In cycle 1, PE00 receives a pixel value c00 of the original image and a pixel value x00 of the reference image, and calculates an absolute difference S00=|c00−x00|.

In the next cycle 2, PE00 receives a pixel value x10 of the reference image, and calculates the sum of absolute difference S01=|c00−x10|. PE10 calculates a value S10 by adding the absolute difference between a pixel value c10 of the original image and a pixel value x10 of the reference image to the value S00 calculated by the PE00 in cycle 1.

In the next cycle 3, PE00 receives a pixel value x20 of the reference image, and calculates the sum of absolute difference S02=|c00−x20|. PE10 calculates a value S11 by adding the absolute difference between a pixel value c10 of the original image and a pixel value x20 of the reference image to the value S01 calculated by the PE00 in cycle 2. PE20 calculates a value S20 by adding the absolute difference between a pixel value c20 of the original image and a pixel value x20 of the reference image to the value S10 calculated by the PE10 in cycle 2.

As mentioned above, each of PE00-PE31 executes calculation like a pipeline, so that a sum of absolute difference between c00-c31 and x00-x31 is output from the output terminal ADOUT of the PE array 40 initially. In the next cycle, the sum of absolute difference between c00-c31 and x10-x41 is output, and in the next cycle, the sum of absolute difference between c00-c31 and x20-x51 is output. Accordingly, the sum of absolute difference within the search range of the motion vector is sequentially output in each cycle (refer to non-patent documents 1 and 2, and patent documents 1 and 2 for more details).

FIG. 11 shows a timing chart in the PE array 40. In FIG. 11, HOLDMB indicates a start signal that instructs each of PE00-PE31 to hold original image input data SMB and to start calculation. CLK indicates a clock, and HOLDSEL indicates a reference image switch control input signal. In FIG. 11, a pixel value of the reference image is represented as pixel coordinates (x, y) of the reference image. For example, (0, 0) corresponds to a pixel value x00 shown in FIG. 10. Each pixel value of the reference image is sequentially supplied to the PE array 40. But, normally, pixel values of a plurality of pixels are read together from the reference image memory for convenience of the method of storing pixels in the memory and in order to decrease the number of times of memory accesses. In the example shown in FIG. 11, reference image pixel values of (0, 0)-(6, 0) and (0, 1)-(6, 1) are simultaneously input from the reference image memory at CLK0, and reference image pixel values of (0, 2)-(6, 2) and (0, 3)-(6, 3) are simultaneously input from the reference image memory at CLK8.

As to the pieces of data of 7 pixels×2 read at CLK0, first 7 pixels are sequentially supplied to the PE array 40 in 7 clocks starting from CLK1, and remaining 7 pixels are sequentially supplied to the PE array 40 in 7 clocks starting from CLK5. At CLK9, a result of accumulation of the sum of absolute difference at the search origin position coordinates (0, 0) is output.

FIG. 12 shows read timing for reading data from the reference image memory. As mentioned before, in the first cycle, the pieces of data of 7 pixels×2 are read from the reference image memory. Since two pieces of data cannot be simultaneously read from a same memory bank, data is stored in each of banks like Bank0, Bank1, Bank2, Bank0, ..., for each line of the image, for example. Accordingly, bank conflict can be avoided, so that pieces of data in Bank0 and Bank1 can be read simultaneously from the reference image memory, for example.

In the above-mentioned motion search apparatus that has a mechanism for reading data from the reference image memory, when the process goes from the lowermost line in the search range of the reference image to the uppermost line for next motion search, it is necessary to read pieces of data of 7 pixels×3 simultaneously, that is, it is necessary to read data of the lowermost line together with data of uppermost two lines, in order not to waste processing time in the PE array 40. This process corresponds to reading in cycle 32 shown in FIG. 12. That is, in the cycle 32, it is necessary to simultaneously read the lowermost line having (0, 8) at the top and two uppermost lines having (4, 0) and (4, 1) at each top. In this example, although a case where the number of lines in the search range is an odd number is explained, similar process can be performed also for a case where the number is an even number.

In motion search for conventional image coding schemes such as MPEG-2, it is not necessary to perform search in which a reference position in the reference image goes out of the screen. Therefore, in the conventional schemes, even when pieces of data of the lowermost line and the two uppermost lines are read simultaneously, problem of delay in memory reading due to bank conflict does not occur since the banks are different for each piece of data.

[Non-patent document 1] Toshihiro MINAMI, Toshio KONDO, Kazuhito SUGURI and Ryota KASAI, "A Proposal of a One-dimensional Systolic Array Architecture for the Full-search Block Matching Algorithm", IEICE Trans. D-I, Vol. J78-D-I, No. 12, pp. 913-925, December 1995.

[Non-patent document 2] Toshihiro MINAMI and Jiro NAGANUMA, "A Proposal of the Construction Method of the Motion Vector Detector Suitable for the Telescopic Search", IEICE Trans. D-II, Vol. J87-D-II, No. 11, pp. 2007-2024, November 2004.

[Patent document 1] Japanese Patent No. 3127980

[Patent document 2] Japanese Laid-Open Patent Application No. 2005-136455

DISCLOSURE OF THE INVENTION

Problem to be Solved by the Invention

FIGS. 13A-13C are diagrams showing a search range for detecting a motion vector. The motion search is performed for searching the reference image 100 for a position having a pixel value group that is the closest to the coding target block 201 in the original image 200 shown in FIG. 13A. In the motion search, a pixel value group of the size of the coding target block is sequentially cut out from the search region 102 of a predetermined size while shifting little by little centering around a search center 101 that is the coordinate position of the coding target block, so that the sum of absolute difference (SAD) between the cut out pixel values and the pixel values of the coding target block 201 is calculated. Then, motion evaluation is performed based on the sum of absolute difference calculated within the search range 102, so that the motion vector is determined.

For example, the H.264 coding scheme is defined such that the motion search can be performed by extending to the outside of the reference image 100. That is, in the specification of the H.264, as shown in FIG. 13B, when the position of the coding target block 201 is near an end part of the original image 200, the search region 100 extends to the outside of the reference image 100. In this case, as shown in FIG. 13C, as to pixel values of the outside of the screen of the reference image 100, values copied from pixel values of the uppermost stage of the reference image 100 is used for the outside of the upper side of the screen, and values copied from pixel values of the leftmost line of the reference image 100 is used for the outside of the left side of the screen. Copied values used for the lowermost stage and the rightmost end of the reference image 100 are used similarly.

As a simplest method for performing motion search by using the PE array 40 shown in FIG. 9A when using the copied value as the pixel values in the outside of the screen, a following method can be considered. In the method, the size of the reference image memory for one reference image is set to be larger than the size of the reference image by the amount of the search region of the outside of the screen, and the pixel values of the outside of the screen is set to be the same as the pixel values of the end part of the screen beforehand when storing the reference image. However, this method has a problem in that additional hardware amount for the reference image memory becomes necessary.

As another method, there is a method in which a pixel value of the end part of the screen is read if the search region is outside the screen when reading pixel values from the reference image memory. However, according to this method, a problem of bank conflict occurs as described below.

FIGS. 14A and 14B are diagrams for explaining a memory bank configuration and explaining the problem of bank conflict when reading pixels outside the screen. In FIGS. 14A and 14B, LAX indicates logical address in the X direction, and LAY indicates logical address in the Y direction. In addition, #0, #1, . . . , #5 indicate bank numbers of memory banks. When bank numbers are different between memory banks, data can be simultaneously read from the memory banks. But, data in areas of the same bank number cannot be read simultaneously due to bank conflict.

As shown in FIG. 14A, in the case when the motion search range is within the screen, when search process moves from the lowermost line in the search region to the uppermost line, pieces of data that are read simultaneously are the lowermost line of bank #2 and two uppermost lines of banks #0 (and #3) and #1 (and #4). Therefore, bank conflict does not occur, which is similar to the conventional technique.

However, in the case when the motion search region is in the outside of the upper side of the screen as shown in FIG. 14B, for example, when search process moves from the lowermost line in the search region to the uppermost line, data of the lowermost line of LAY=8 and data of the line of the screen end part of LAY=5 are read instead of reading data of the lowermost line of LAY=8 and data of two uppermost lines of LAY=0 and LAY=1, since values copied from pixel values of the end part of the screen need to be used for the outside of the screen. However, as is apparent from the figure, the bank number for both of the lines of LAY=8 and LAY=5 is the same number of #0. Since the number is the same, bank conflict occurs, so that these pieces of data cannot be read simultaneously.

If the banks of the memory are increased for solving the problem, the memory bank configuration becomes complicated. In addition, if data reading is delayed until another data reading is completed, the flow of the pipeline processing is disturbed in the PE array 40, so that there occurs a problem in that calculation time increases.

For example, if it is assumed that additional time of 8 cycles is necessary for reading data in conflict, about 25% overhead will be added based on rough estimation. The reason is as follows. When there is no bank conflict, it can be considered that all of the vertical 9 lines are read by using time corresponding to 4 times of reading. On the other hand, if there is the bank conflict, time corresponding to 5 times of reading is required for reading all of the vertical 9 lines since the last 1 line and the 2 uppermost lines cannot be read simultaneously.

The above problems can be explained together as follows.

When motion vector detection is configured by using the PE array (systolic array) 40 shown in FIG. 9A, it is necessary to read a plurality of lines of pixels of the reference image simultaneously. Therefore, it is necessary to assign lines that may be read simultaneously to different banks on the memory.

In order to apply this scheme to H.264 and the like for which motion vector outside of the screen is permitted, it is necessary to store additional pixels of the outside of the screen (pixels values are values of boundary pixels) in the memory. Therefore, there is a problem in that the hardware amount of the memory increases. However, in the case when the memory for storing the pixels outside the screen is not provided, the reading pattern in the systolic array becomes irregular when pixels outside the screen are included, and bank conflict occurs as shown in FIG. 14B, so that there is a problem in that high speed calculation cannot be performed.

An object of the present invention is to solve the above-mentioned problem, and to provide a motion search apparatus in which bank conflict does not occur without increasing memory for storing the pixels outside the screen.

Means for Solving the Problem

In the present invention, in motion search performed by the PE array that executes calculation in parallel by using a plurality of processor elements (PEs), when the uppermost line of the pixel group of the reference image used for calculation of the sum of absolute difference with respect to the coding target block is outside the screen, the uppermost line in the screen is read. Further, only the lowermost line is read in advance simultaneously with reading of the next previous line so that the read timing is advanced, in order to avoid bank conflict when reading the lowermost line in a search range and the uppermost line in a next search range simultaneously. The data of the lowermost line read in advance is held in a data holding circuit such as a shift register and the like, and is supplied from the data holding circuit when the PE array needs the data for calculation.

In addition, when pixels of the search range are outside the screen of the reference image in a horizontal direction, pixel values of the end of the screen are copied after reading the line. By the way, when the lower side in the vertical direction is outside the screen, the line of the end of the screen that has been read is copied and can be used as it is.

More particularly, the present invention is a motion search apparatus for use in video coding, including:

a PE array unit configured to calculate a sum of absolute difference between an original image and a reference image by performing calculation in parallel using a plurality of processor elements;

a memory configured to store pixel data of the reference image that is a target for motion search;

a memory read unit configured to read pixel data of the reference image from the memory;

a pixel permuting unit configured to permute the pixel data read from the memory and input the pixel data to the PE array unit;

an evaluation unit configured to detect and evaluate a motion vector in a predetermined search range of the reference image based on the sum of absolute difference calculated by the PE array unit; and a control unit configured to control motion search by each of the units, the memory read unit including a conflict bank anticipatory read control unit configured to perform control for, when pieces of pixel data of a plurality of lines to be input to the PE array unit simultaneously are stored in a same bank in the memory, shifting read timing for reading the pixel data of the plurality of lines from the memory in units of lines, and reading pixel data at a timing earlier than a timing required for inputting to the PE array unit, and the pixel permuting unit including a read data holding circuit configured to hold the pixel data of a line read by the memory read unit at the timing earlier than the timing required for inputting to the PE array unit until timing for inputting to the PE array unit.

In the above-mentioned invention, the pixel permuting unit includes a vertical direction copy unit configured, when a region of the motion search range is a region outside the screen of the reference image in a vertical direction, to copy pixel data of a line of a boundary part of the screen of the reference image as pixel data of the region outside the screen, and to input the copied data to the PE array unit.

Also, in the present invention, the pixel permuting unit includes a horizontal direction copy unit configured, when a region of the motion search range is a region outside the screen of the reference image in a horizontal direction, to copy pixel data of a boundary part of the screen in the same line of the reference image in the horizontal direction as pixel data of the region outside the screen, and to input the copied data to the PE array unit.

Effect of the Invention

According to the present invention, in motion search that is performed by using the PE array, a motion vector outside the screen can be also detected. Especially, it is not necessary to have a memory for the outside (vertical direction) of the screen, and also, it is not necessary to have a memory for the outside (horizontal direction) of the screen. In addition, bank conflict can be avoided without increasing the bank number of memory banks.

BRIEF DESCRIPTION OF THE DRAWINGS

FIG. 3 is a detailed block diagram of a memory read unit;

FIG. 4 is a detailed block diagram of a pixel permuting unit;

FIG. 9A is a diagram showing a configuration example of a PE array in a conventional motion search apparatus;

FIG. 9B is a diagram showing a configuration example of a PE;

FIG. 10A is a diagram for explaining operation of the PE array;

FIG. 10B is a diagram for explaining operation of the PE array;

FIG. 12 is a diagram showing read timing for reading data from the reference image memory;

FIG. 14A is a diagram for explaining a memory bank configuration and a problem of bank conflict when reading pixels outside the screen.

Figure 1A:
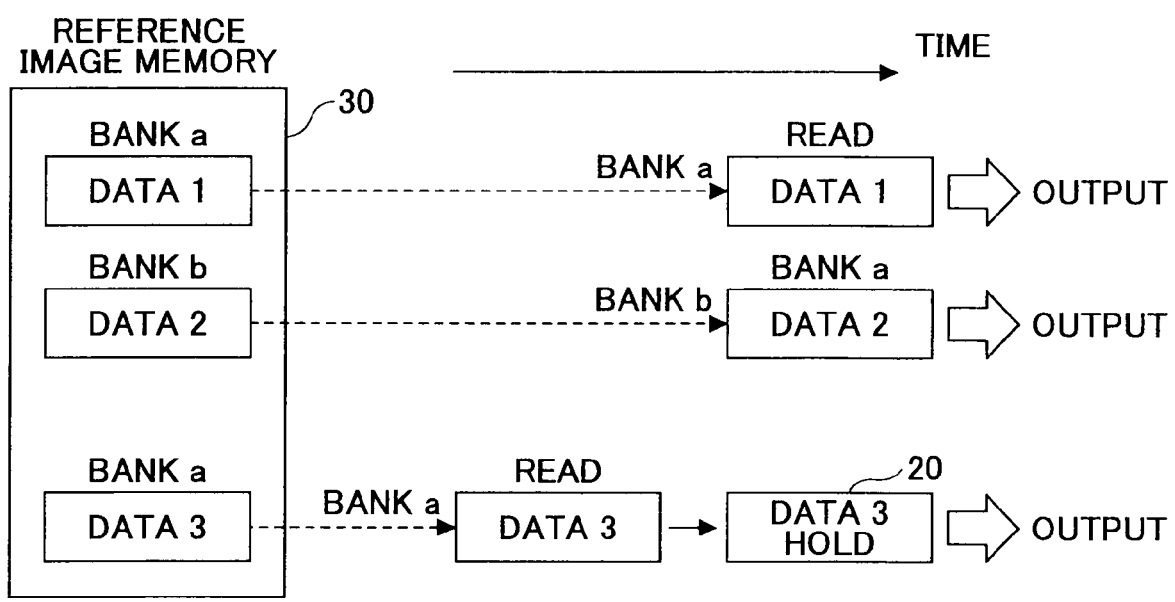
FIG. 1A is a diagram for explaining outline of the present invention.

DESCRIPTION OF REFERENCE SIGNS 1 memory read unit
2 pixel permuting unit
3 memory
4 PE array unit
5 evaluation unit
6 control unit
10 conflict bank anticipatory read control unit
11 logical address generation unit
12 outside-screen determination unit
13 logical address/real address conversion unit
14 memory access unit
20 read data holding circuit
21 horizontal direction cutting unit
22 horizontal direction copy, unit
23 parallel/serial conversion unit
24 vertical direction copy unit
25 vertical direction permuting unit
30 reference image memory

PREFERRED EMBODIMENTS FOR CARRYING OUT THE INVENTION

Figure 1B:
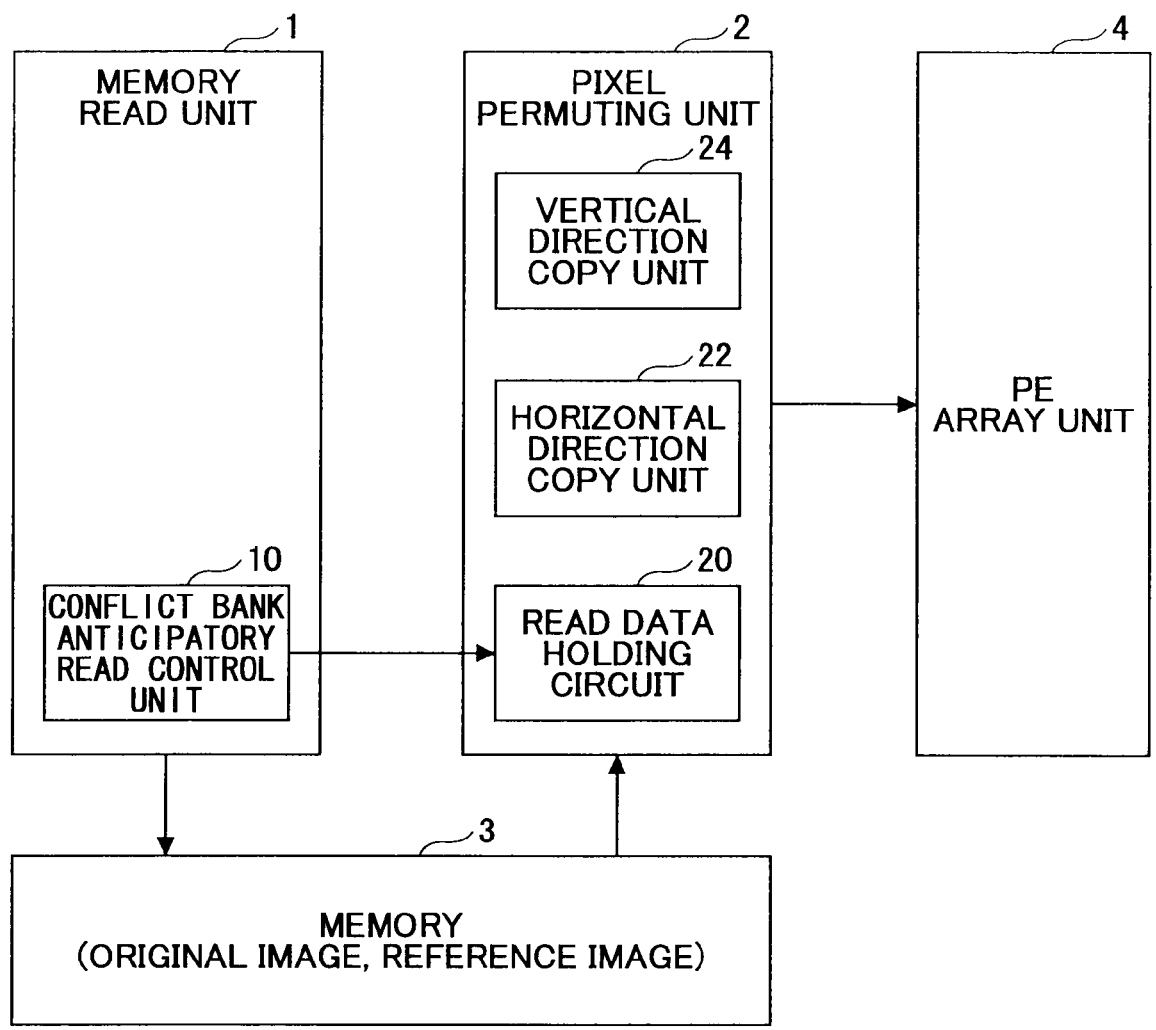
FIG. 1B is a diagram for explaining outline of the present invention.

FIGS. 1A and 1B are diagrams for explaining the outline of an embodiment of the present invention. In the reference image memory 30 shown in FIG. 1A, it is assumed that data 3 of the lowermost line in the search range is stored in a bank a of the memory, and that data 1 and data 2 of the uppermost line of a next search range are stored in bank a and bank b respectively. If these pieces of data are read simultaneously from the reference image memory 30 in order to supply them to the PE array unit 4, bank conflict occurs since data 1 and data 3 exist in the same bank a.

Thus, when detecting a motion vector in the search region outside the screen, a conflict bank anticipatory read control unit 10 in a memory read unit 1 shown in FIG. 1B performs control to read the data 3 of the lowermost line in advance simultaneously with reading a previous line if bank conflict between the lowermost line and two uppermost lines in the search range occurs.

A pixel permuting unit 2 permutes pixel data read from the memory 3 according to calculation order in the PE array unit 4 and provides the permuted data to the PE array, unit 4. Especially, the pixel permuting unit 2 holds the data 3 of the lowermost line read in advance in a read data holding circuit 20, and provides the data to the PE array unit 4 at a time when it becomes necessary to input the data to the PE array unit 4.

When detecting a motion vector in a search region outside the screen in a horizontal direction, a horizontal direction copy unit 22 copies pixel values of the end of the screen and provides the copied data to the PE array unit 4. When the area of the search range is outside the upper side of the screen or outside the lower side of the screen, a vertical direction copy unit 24 copies pixel values of a boundary of the upper side of the screen or a boundary of the lower side of the screen and provides the copied data to the PE array unit 4.

Figure 2:
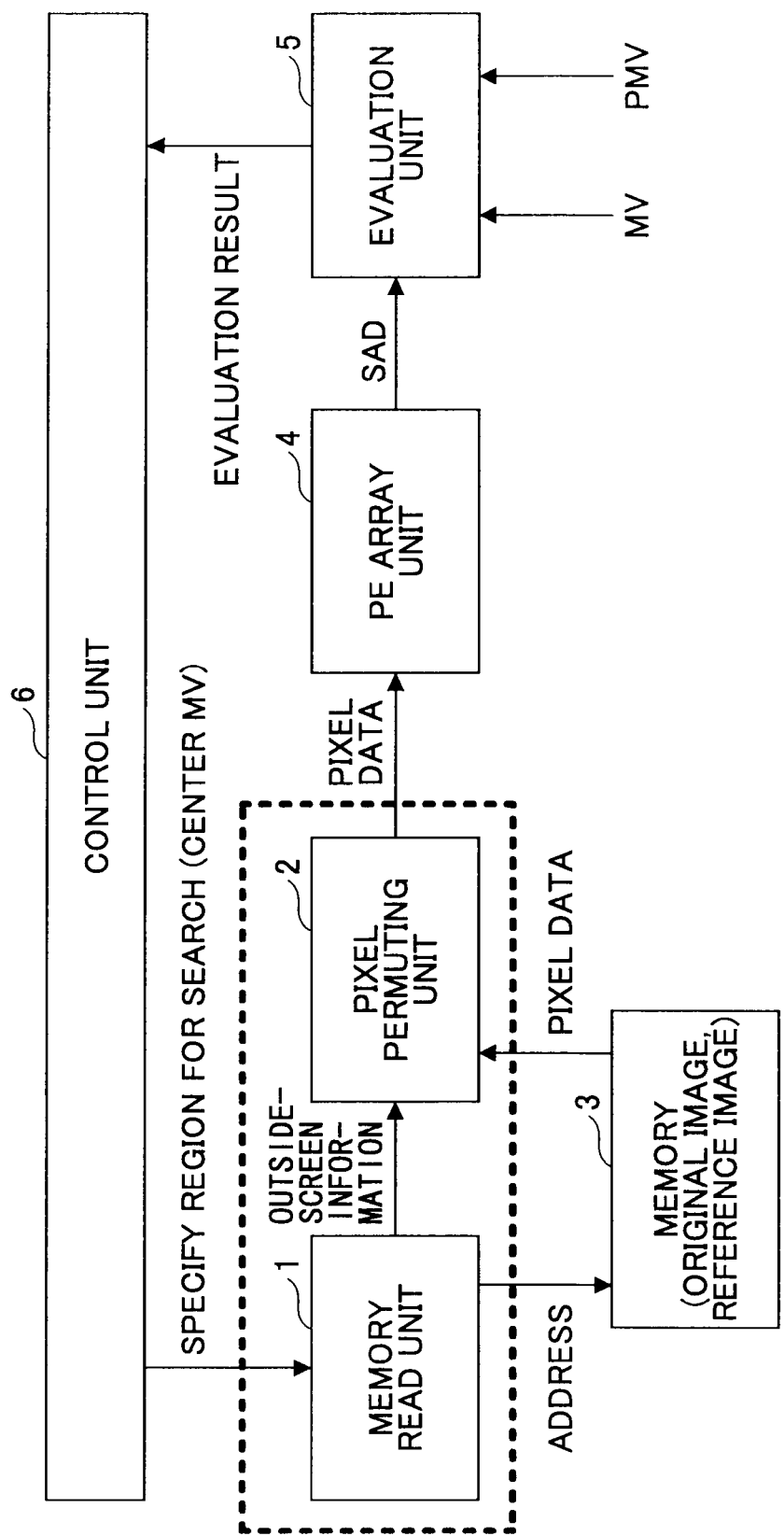
FIG. 2 is a whole block diagram of a motion search apparatus of the present embodiment.

FIG. 2 is a whole block diagram of the motion search apparatus of the present embodiment. FIG. 3 is a detailed block diagram of the memory read unit 1, and FIG. 4 is a detailed block diagram of the pixel permuting unit 2.

Configuration of each unit other than the memory read unit 1 and the pixel permuting unit 2 is similar to configuration of the conventional motion search apparatus using systolic array. The memory 3 stores pixel data of the original image and the reference image. The pixel data of the original image may be stored in another memory and may be input from an input terminal. The PE array unit 4 is configured by a plurality of PE arrays 40 according to the size of the coding target block, each PE array 40 including a plurality of processor elements (PE), selector, adding circuit, and register and the like as described by referring to FIGS. 9A and 9B. An evaluation unit 5 evaluates the motion vector based on the sum of absolute difference (SAD) output from the PE array unit 4, and cost information of coding such as difference between motion vector MV and predicted motion vector PMV, and returns an evaluation result to the control unit 6.

The control unit 6 performs control of the whole of the motion search apparatus using program control. The control unit 6 instructs the memory read unit 1 to start search by specifying a search region (center motion vector MV). The memory read unit 1 converts each logical address indicating the search range into each real address in the memory 3, so as to request memory read for the memory 3. In addition, the control unit 6 checks whether the search range is outside the screen, and when the range is outside the screen, the control unit 6 reports outside-screen information to the pixel permuting unit 2. The pixel permuting unit 2 performs cut-out and permutation for the pixel data read from the memory 3, and provides the processed data to the PE array unit 4.

Figure 14B:
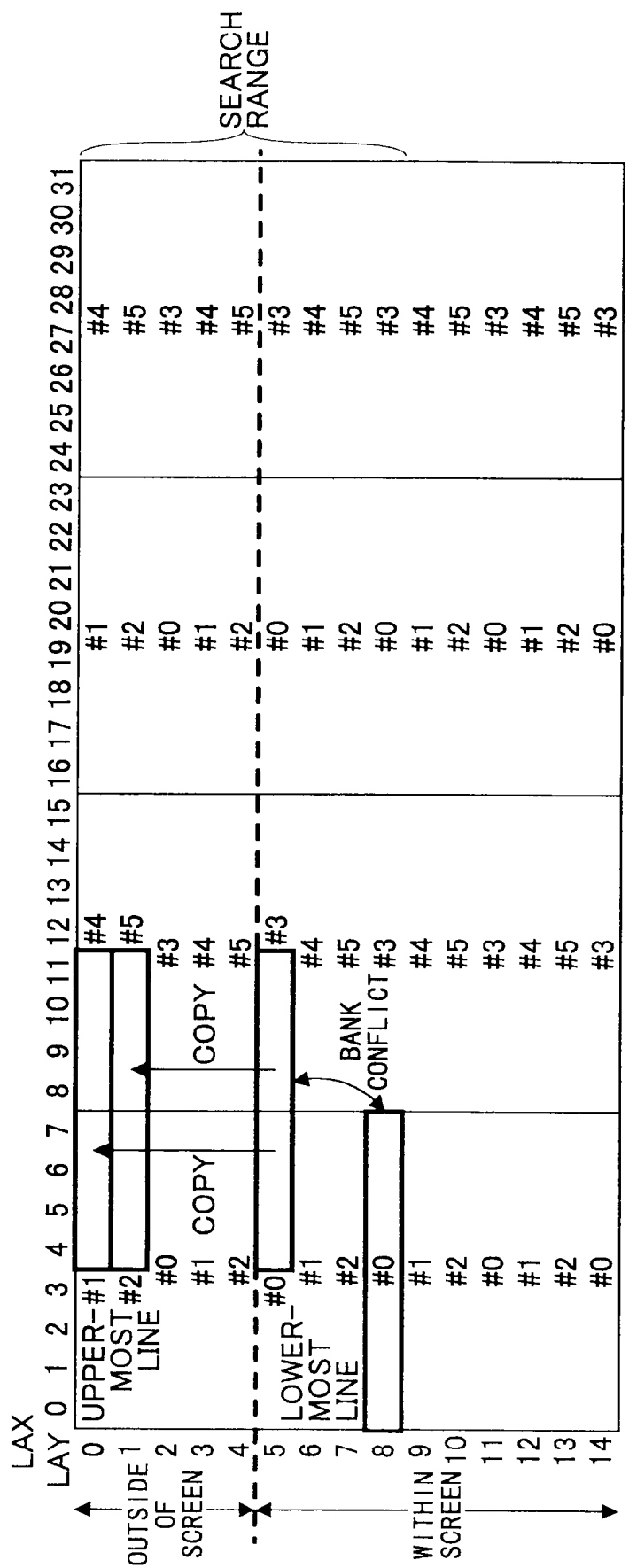
FIG. 14B is a diagram for explaining a memory bank configuration and a problem of bank conflict when reading pixels outside the screen.

As shown in FIG. 3, the memory read unit 1 includes a logical address generation unit 11, a outside-screen determination unit 12, a logical address/real address conversion unit 13, and a memory access unit 14. The logical address generation unit and the logical address/real address conversion unit 13 are similar to those of the conventional apparatus. The logical address generation unit 11 generates a logical address LAX and LAY indicating a relative address of the search range shown in FIGS. 14A and 14B based on information of the center motion vector MV that specifies a search region specified by the control unit 6.

The outside-screen determination unit 12 determines whether the logical address generated by the logical address generation unit 11 is within the screen of the reference image or outside the screen, and when it is outside the screen, the outside-screen determination unit 12 sends outside-screen information to the memory access unit 14 and to the pixel permuting unit 2. The logical address/real address conversion unit 13 converts the logical address generated by the logical address generation unit 11 to the real address where actual pixel data is stored in the memory 3. The conversion from the logical address to the real address can be easily performed by storing the head real address of the reference image when storing the reference image into the memory 3. Also as to the address of the coding target block in the original image reported from the control unit 6 beforehand, conversion into the real address is performed.

The converted real address is sent to the memory access unit 14. The memory access unit 14 sends a read request to the memory 3 at an after-mentioned timing according to FIG. 8. Especially, when the search range includes the outside of the upper side of the screen, the conflict bank anticipatory read control unit 10 performs access control to avoid bank conflict as explained in FIG. 1.

As shown in FIG. 4, the pixel permuting unit 2 includes a horizontal direction (X direction) cutting unit 21, a horizontal direction copy unit 22, a parallel/serial conversion unit 23, a vertical direction (Y direction) copy unit 24, and a vertical direction permuting unit 25. Among these units, the horizontal direction (X direction) cutting unit 21, the parallel/serial conversion unit 23 and the vertical direction permuting unit 25 are similar to those of the conventional apparatus.

The data read from the memory 3 to the pixel permuting unit 2 includes data of 16 pixels per 1 line. Thus, the horizontal direction cutting unit 21 cuts out data of 8 pixels×3 lines that are necessary for motion search from among the read data.

When performing calculation for detecting outside screen motion vector in the horizontal direction, the horizontal direction copy unit 22 performs processing for copying pixel values of the boundary of the screen (screen end) as pixel data outside the screen based on the outside-screen information reported from the outside-screen determination unit 12.

Figure 5A:
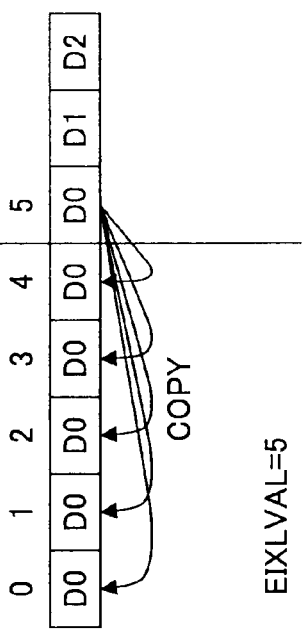
FIG. 5A is a diagram for explaining a method for copying pixel values performed by a horizontal direction copy unit.
Figure 5B:
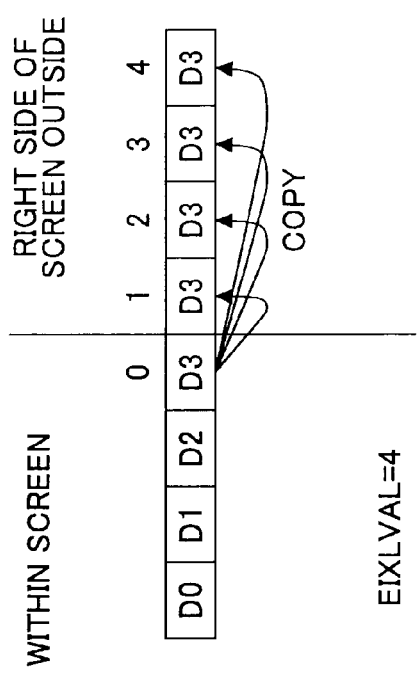
FIG. 5B is a diagram for explaining a method for copying pixel values performed by a horizontal direction copy unit.

FIGS. 5A and 5B are diagrams for explaining a method for copying the pixel values performed by the horizontal direction copy unit 22. In FIGS. 5A and 5B, EILRFLG indicates a left and right region flag. When the flag is "00", the whole search region exists within the screen. When the flag is "10", the end of the screen exists in the left side, and when the flag is "01", the end of the screen exists in the right side. EIXLVAL indicates a distance from the left side screen end in the X direction, and EIXRVAL indicates a distance from the right side screen end in the X direction. D0-D7 are data of pixel values, and MSB indicates data at the uppermost side of an 8 pixel data sequence, and LSB indicates the lowermost data.

The horizontal direction copy unit 22 receives information of EILRFLG, EIXLVAL, EIXRVAL and the like from the outside-screen determination unit 12 as the outside-screen information. According to the values, when EILRFLG=10, the horizontal direction copy unit 22 performs copying of pixel values in the X direction as shown in (A1) and (A2) of FIG. 5A. When EILRFLG=01, the horizontal direction copy unit 22 performs copying of pixel values in the X direction as shown in (B1) and (B2) of FIG. 5B.

Figure 6:
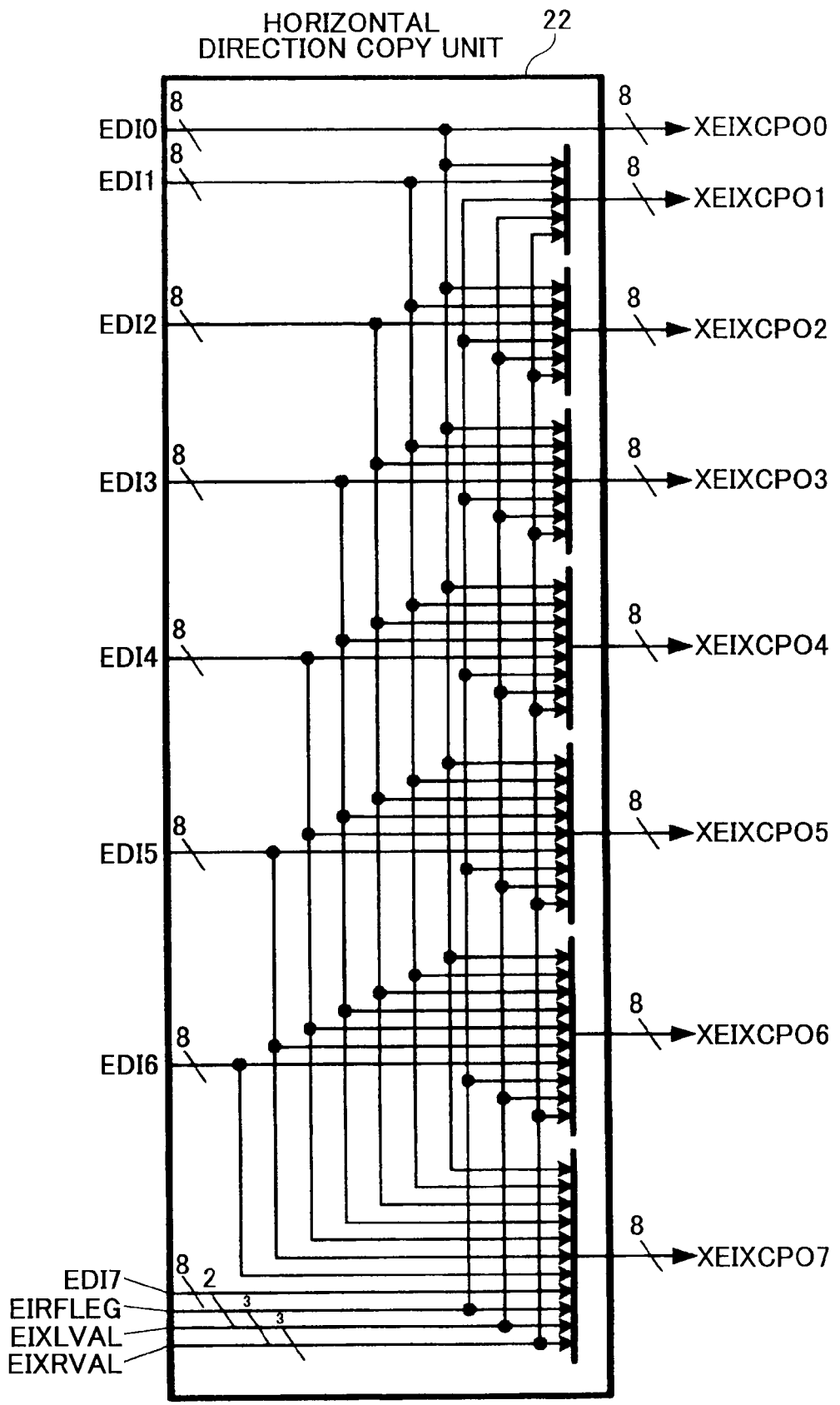
FIG. 6 is a diagram showing a circuit configuration example of the horizontal direction copy unit.

FIG. 6 shows a circuit configuration example of the horizontal direction copy unit 22. In FIG. 6, EDI0-EDI7 are input data of pixel values of D0-D7 respectively shown in FIGS. 5A and 5B. In addition, XEIXCPO0-XEIXCPO7 are X direction pixel copy process data 0-X direction pixel copy process data 7 respectively, and are output data of the result obtained by copying the screen end data into the screen outside as shown in FIG. 5.

The horizontal direction copy unit 22 selects input data EDI0-EDI7 of pixel values using selectors shown in FIG. 6 based on input signals of EILRFLG, EIXLVAL and EIXRVAL, so that the horizontal direction copy unit 22 performs copy of data in the X direction as shown in FIGS. 5A and 5B.

The parallel/serial conversion unit 23 shown in FIG. 4 cuts out pixel data of 8 pixel×3 lines output by the horizontal direction copy unit 22 pixel by pixel for each line in order, converts the cut-out data into pixel data of 1 pixel×3 lines, and output the data.

When the region of the search range is outside the upper side of the screen or outside the lower side of the screen, the vertical direction copy unit 24 performs processing for copying pixel values of the boundary of the upper side of the screen or the boundary of the lower side of the screen.

Figure 7:
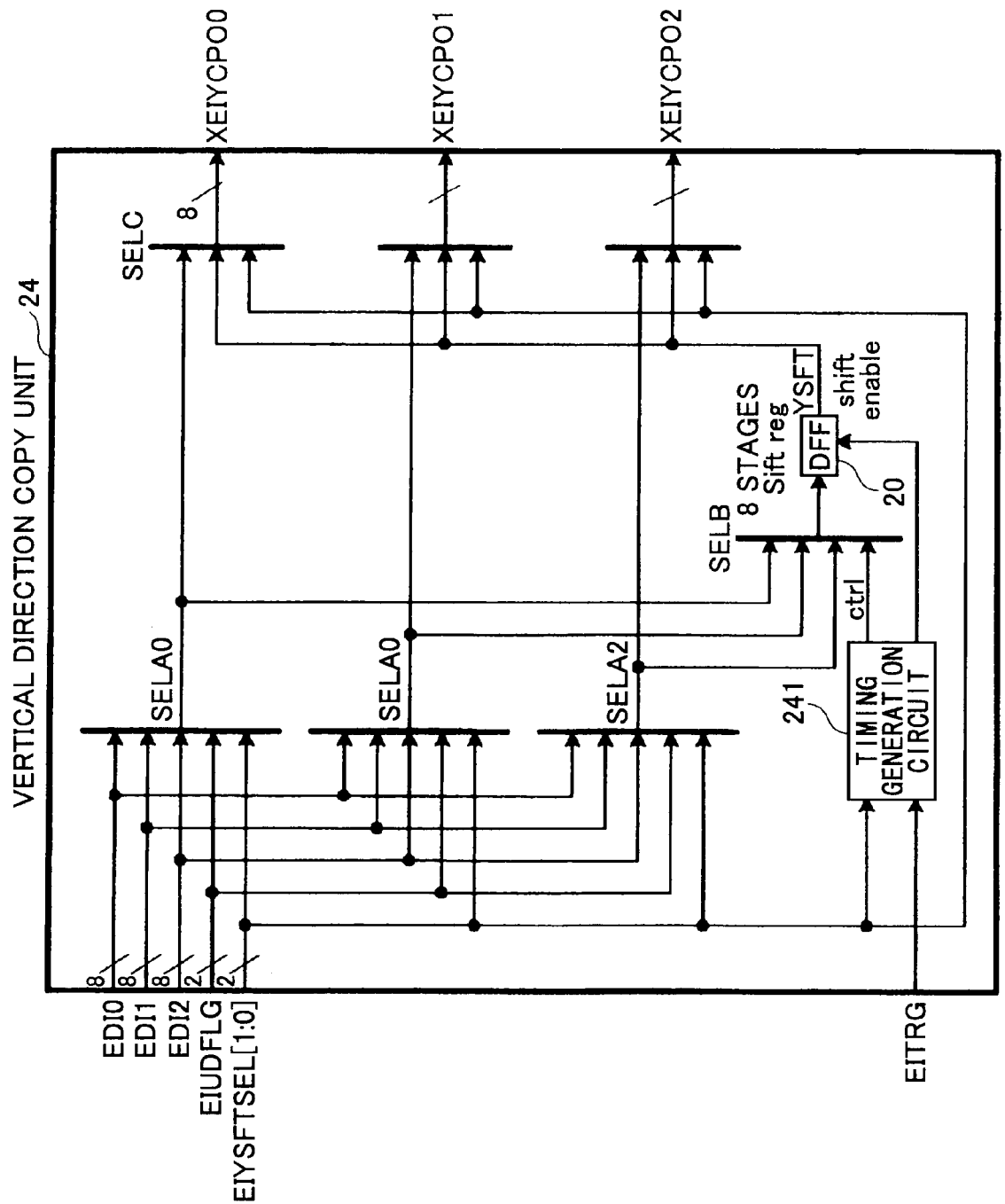
FIG. 7 is a diagram showing a circuit configuration example of the vertical direction copy unit.

FIG. 7 shows a circuit configuration example of the vertical direction copy unit 24. In FIG. 7, EDI0-EDI2 are input data 0-3 of 3 lines. EIUDFLG is an upper/lower region flag indicating whether the region is in the upper side of the screen or in the lower side of the screen, and is a signal received from the outside-screen determination unit 12 as the outside-screen information. When the flag is "00", it indicates that the region is within the screen. EIYSFTSEL is an input data Y direction shift control signal, and indicates whether to shift the input data in vertical direction (Y direction) for copying. EITRG is a memory enable signal, and indicates a timing when reading data from the memory 3.

XEIYCPO0-XEIYCPO2 are Y direction pixel copy process data outputs 0-2 of 3 lines. In a normal search, two lines of data among them are used. But, when the process goes from the lowermost line of a search range to the uppermost line of a next search range, data of 3 lines are output.

The timing generation circuit 241 is a circuit for controlling data holding into the read data holding circuit 20. As explained with reference to FIGS. 1A and 1B, the read data holding circuit 20 holds data of the lowermost line read in advance for 8 cycles, and delays the data by 8 cycles and outputs the data. The read data holding circuit 20 is configured by a shift register of 8 stages, for example, and delays the data of the lowermost line of the search range read beforehand by 8 cycles based on the shift enable signal of the timing generation circuit 241.

The vertical direction permuting unit 25 permutes the pixel data of 1 pixel×3 lines output by the vertical direction copy unit 24 and outputs the data to the PE array unit 4. The processing of the permutation of the pixel data by the vertical direction permuting unit 25 is similar to permutation processing in the conventional motion search apparatus used for MPEG-2 and the like.

Figure 8:
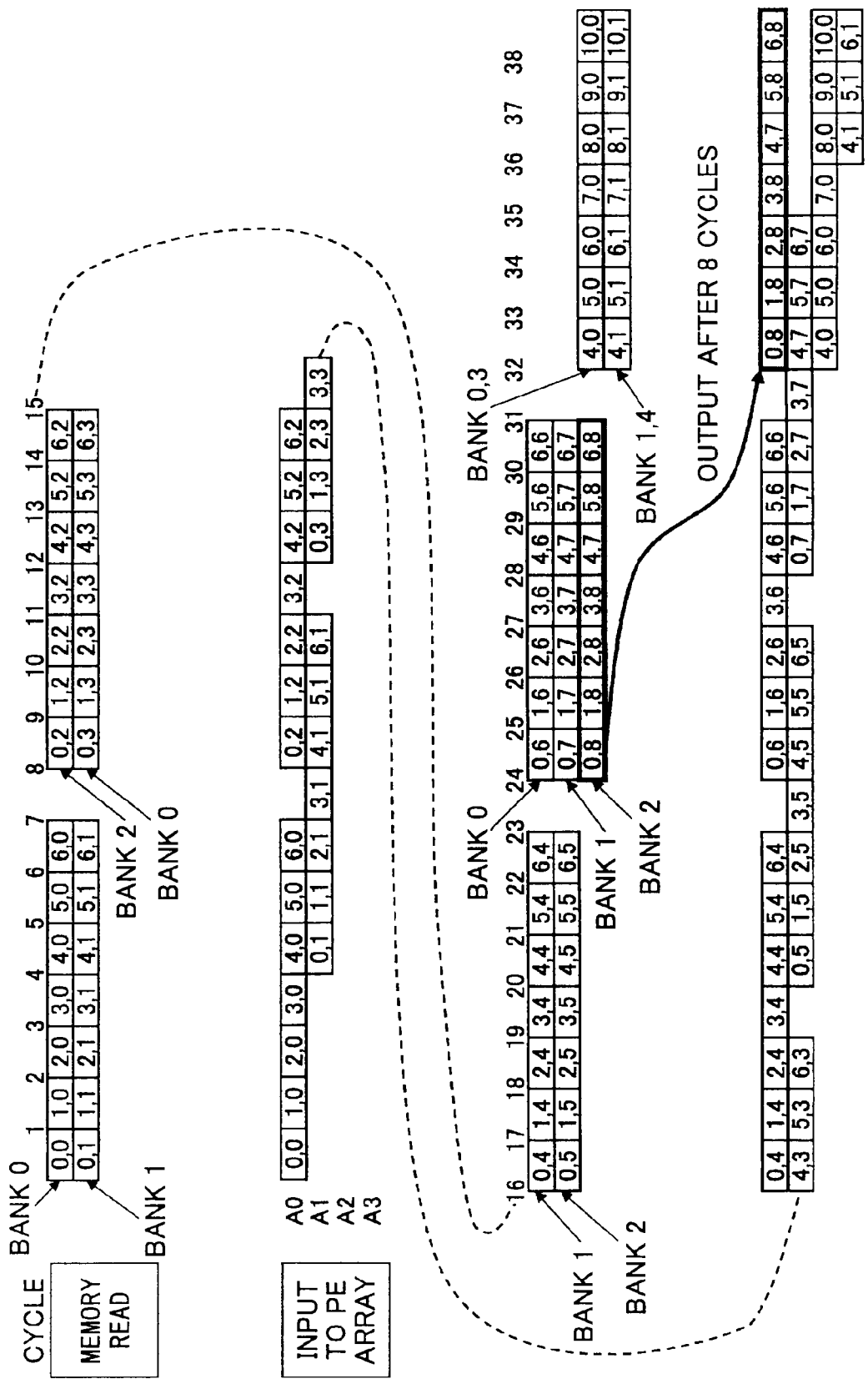
FIG. 8 is a diagram showing timing for reading reference image data from the memory in the present embodiment.
Figure 10C:
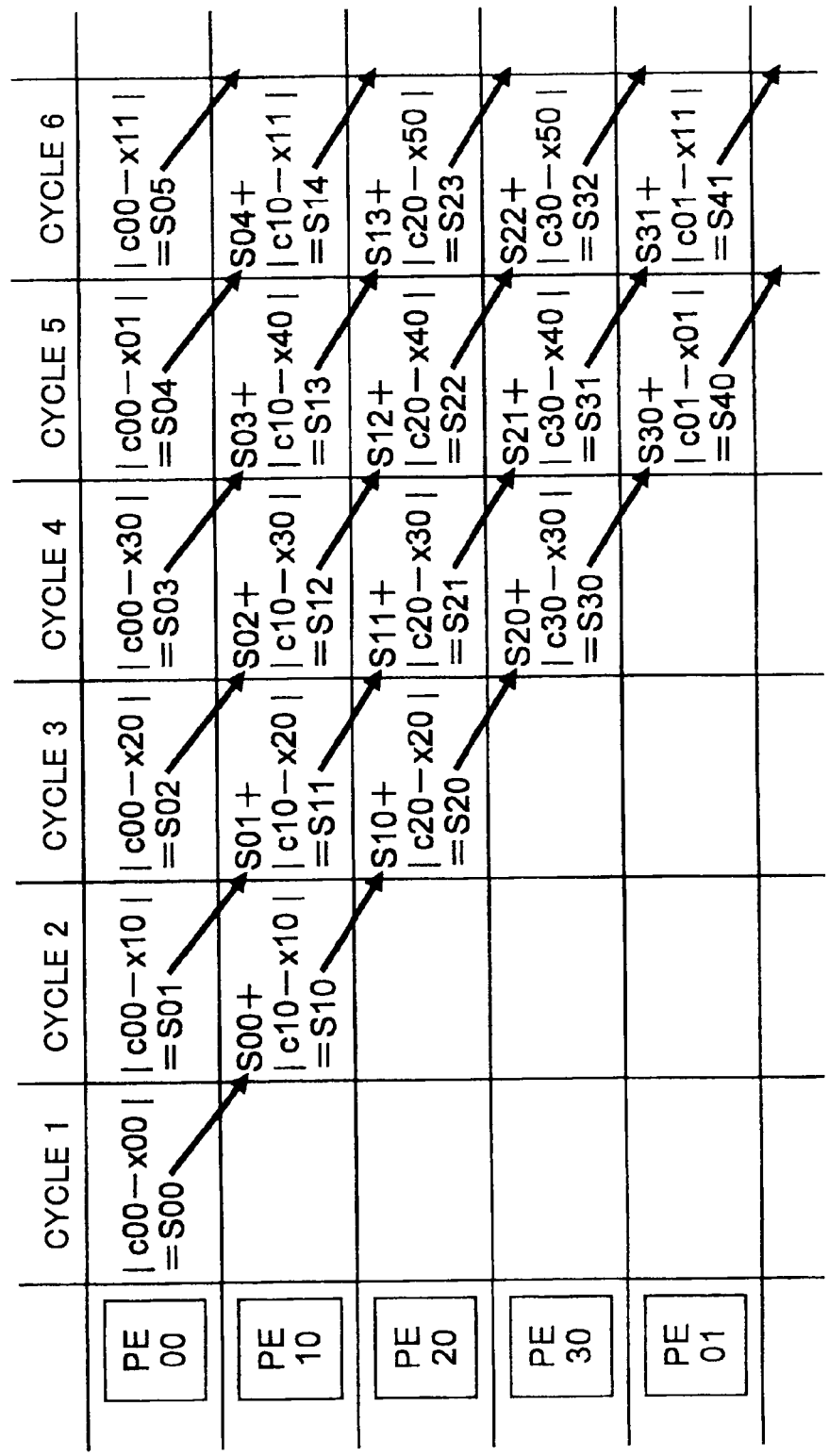
FIG. 10C is a diagram for explaining operation of the PE array.
Figure 11:
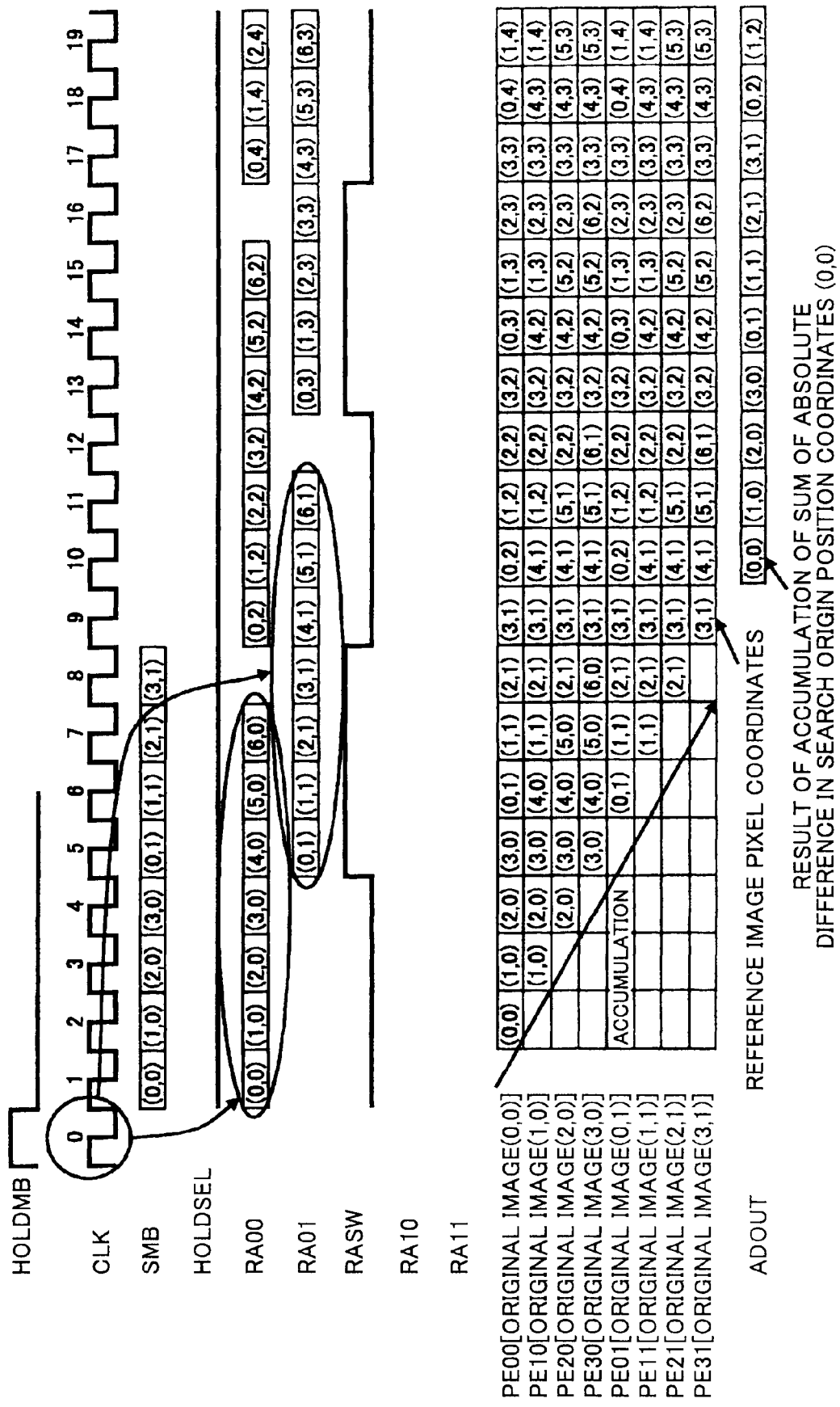
FIG. 11 is a diagram showing a timing chart in the PE array.
Figure 13A:
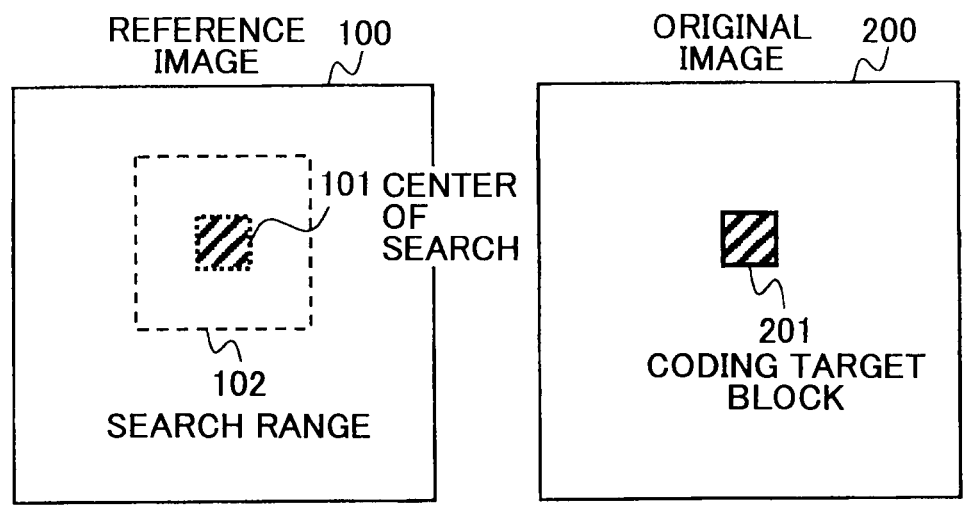
FIG. 13A is a diagram showing a search range for detecting a motion vector.
Figure 13B:
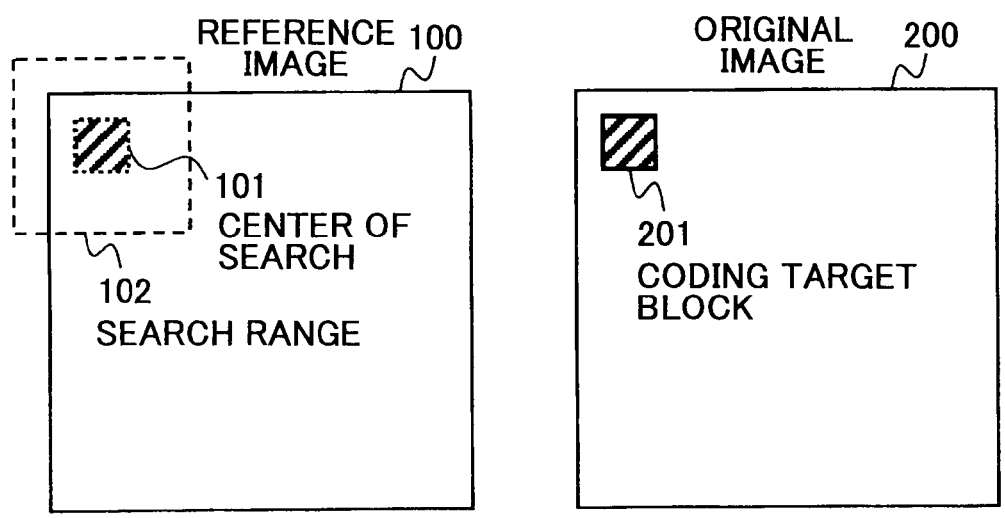
FIG. 13B is a diagram showing a search range for detecting a motion vector.
Figure 13C:
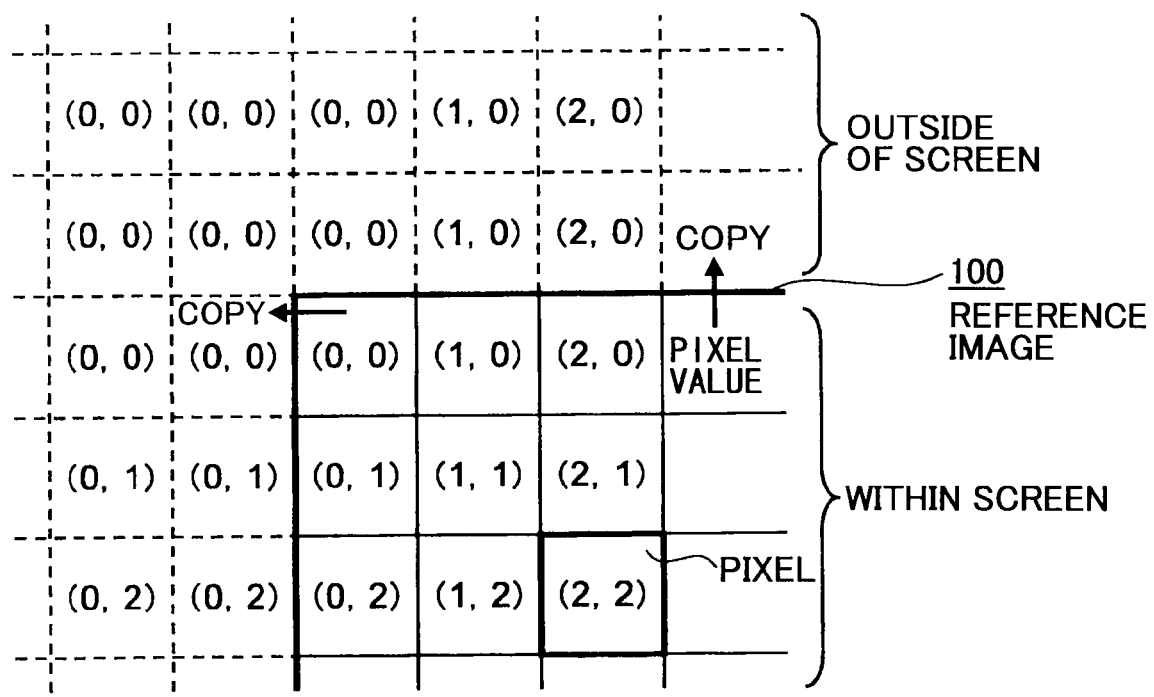
FIG. 13C is a diagram showing a search range for detecting a motion vector.

FIG. 8 shows timing for reading reference image data from the memory 3 in the present embodiment.

Reading of data until cycle 24 (CLK 24) and supply timing of data to the PE array are similar to timing in the conventional motion search apparatus described with reference to FIG. 12. In the cycle 24, the conventional apparatus shown in FIG. 12 reads pixel data of two lines that are data of bank #0 from (0, 6) to (6, 6) and data of bank #1 from (0, 7) to (6, 7) simultaneously. In the cycle 32 that is the next 8-th cycle, the apparatus reads pixel data of total 3 lines simultaneously that are data in bank #2 of the lowermost line from (0, 8) to (6, 8), data of banks #0 and #3 of the uppermost line from (4, 0) to (10, 0), and data of banks #1 and #4 of the next uppermost line from (4, 1) to (10, 1). Such a process can be performed since bank conflict does not occur in reading after the 32nd cycle.

If read timing similar to the conventional apparatus is used, memory access becomes irregular especially when searching the outside of the screen, so that there is a case bank conflict occurs. Thus, on the other hand, according to the present embodiment, reading is performed as follows.

In cycle 24, the apparatus of the present embodiment reads pixel data of two lines that are data of bank #0 from (0, 6) to (6, 6) and data of bank #1 from (0, 7) to (6, 7), and at the same time, the apparatus reads pixel data of the lowermost line of bank #2 from (0, 8) to (6, 8). The pixel data read from the lowermost line is held in the read data holding circuit 20 in order to output to the PE array after 8 cycles.

In the cycle 32 that is the next 8-th cycle, the apparatus reads pixel data of two lines simultaneously that are data of the uppermost line of banks #0 and #3 from (4, 0) to (10, 0), and data of the next uppermost line of banks #1 and #4 from (4, 1) to (10, 1) from the memory 3, and the apparatus outputs, to the PE array, pixel data from (4, 0) to (10, 0) and pixel data from (0, 8) to (6, 8) in units of pixels for each cycle. In cycle 36, the apparatus further outputs pixel data of the line from (4, 1) to (10, 1) to the PE array.

As mentioned above, even though memory access becomes irregular by changing the read timing when the uppermost line is outside the screen, and even though reading of bank #2 that is a bank of the previous lowermost line occurs, bank conflict does not occur since the previous lowermost line has been read before.

The above-mentioned motion search apparatus can be configured by an LSI.

The present international application claims priority based on Japanese patent application No. 2007-237534, filed in the JPO on Sep. 13, 2007 and the entire contents of the Japanese patent application No. 2007-237534 is incorporated herein by reference.

The invention claimed is:

1. A motion search apparatus for use in video coding, comprising:
   a PE array unit configured to calculate a sum of absolute difference between an original image and a reference image by performing calculation in parallel using a plurality of processor elements;
   a memory configured to store pixel data of the reference image that is a target for motion search;
   a memory read unit configured to read pixel data of the reference image from the memory;
   a pixel permuting unit configured to permute the pixel data read from the memory and input the pixel data to the PE array unit;
   an evaluation unit configured to detect and evaluate a motion vector in a predetermined search range of the reference image based on the sum of absolute difference calculated by the PE array unit; and
   a control unit configured to control motion search by each of the units,
   the memory read unit comprising a conflict bank anticipatory read control unit configured to perform control for, when a region of the target of the motion search is outside the reference image so that pieces of pixel data of a plurality of lines to be input to the PE array unit simultaneously are stored in a same bank in the memory, reading pixel data of one line of the plurality of lines from the memory at a timing earlier than a timing required for inputting to the PE array unit, and
   the pixel permuting unit comprising a read data holding circuit configured to hold the pixel data of the line read by the memory read unit at the timing earlier than the timing required for inputting to the PE array unit until timing for inputting to the PE array unit.

2. The motion search apparatus for use in video coding as claimed in claim 1, the pixel permuting unit comprising:
   a vertical direction copy unit configured, when a region of the motion search range is a region outside the screen of the reference image in a vertical direction, to copy pixel data of a line of a boundary part of the screen of the reference image as pixel data of the region outside the screen, and to input the copied data to the PE array unit.

3. The motion search apparatus for use in video coding as claimed in claim 2, the pixel permuting unit comprising:
   a horizontal direction copy unit configured, when a region of the motion search range is a region outside the screen of the reference image in a horizontal direction, to copy pixel data of a boundary part of the screen in the same line of the reference image in the horizontal direction as pixel data of the region outside the screen, and to input the copied data to the PE array unit.

4. The motion search apparatus for use in video coding as claimed in claim 1, the pixel permuting unit comprising:
   a horizontal direction copy unit configured, when a region of the motion search range is a region outside the screen of the reference image in a horizontal direction, to copy pixel data of a boundary part of the screen in the same line of the reference image in the horizontal direction as pixel data of the region outside the screen, and to input the copied data to the PE array unit.

* * * * *